United States Patent
Cooper et al.

(10) Patent No.: US 10,110,755 B2
(45) Date of Patent: Oct. 23, 2018

(54) METHOD AND APPARATUS FOR USE IN SUPPLYING POWER OVER A TELEPHONE LINE

(71) Applicant: British Telecommunications Public Limited Company, London (GB)

(72) Inventors: Ian Robert Cooper, London (GB); Leslie Derek Humphrey, London (GB)

(73) Assignee: British Telecommunications Public Limited Company, London (GB)

( * ) Notice: Subject to any disclaimer, the term of this patent is extended or adjusted under 35 U.S.C. 154(b) by 163 days.

(21) Appl. No.: 15/109,366

(22) PCT Filed: Dec. 24, 2014

(86) PCT No.: PCT/GB2014/000527
§ 371 (c)(1),
(2) Date: Jun. 30, 2016

(87) PCT Pub. No.: WO2015/101764
PCT Pub. Date: Jul. 9, 2015

(65) Prior Publication Data
US 2016/0330334 A1  Nov. 10, 2016

(30) Foreign Application Priority Data
Dec. 31, 2013  (EP) ..................................... 13250132

(51) Int. Cl.
*H04M 19/08* (2006.01)
(52) U.S. Cl.
CPC ........ *H04M 19/08* (2013.01); *H04M 2201/80* (2013.01)
(58) Field of Classification Search
CPC ........ H04L 12/10; H04L 12/12; H04M 19/08; H04M 3/007; H04B 10/807
(Continued)

(56) References Cited

U.S. PATENT DOCUMENTS

| | | | |
|---|---|---|---|
| 4,103,112 A * | 7/1978 | Korsky | H04M 19/003 379/378 |
| 4,815,124 A | 3/1989 | Bowers et al. | |

(Continued)

FOREIGN PATENT DOCUMENTS

| | | |
|---|---|---|
| EP | 0600644 A1 | 6/1994 |
| EP | 1009156 A2 | 6/2000 |

(Continued)

OTHER PUBLICATIONS

Application and File History for U.S. Appl. No. 13/988,941, filed May 22, 2013. Inventors: Humphrey.

(Continued)

*Primary Examiner* — Gerald Gauthier
(74) *Attorney, Agent, or Firm* — Amy M. Salmela; Patterson Thuente Pedersen, P.A.

(57) ABSTRACT

A system comprising customer premises equipment including a reverse power supply unit and an access node to which the customer premises equipment is connected for permitting telephony devices connected to the customer premises equipment to make and receive telephone calls via the customer premises equipment and the access node. The reverse power supply unit is suitable for supplying electrical power from the customer's premises to an access node via a twisted copper pair, the reverse power supply unit including a power consumption signature detector operable to detect if the power drawn from the reverse power supply unit corresponds to a signature power consumption pattern indicative of a telephony device being in or transitioning into an off-hook state when connected directly to the reverse power supply unit and not being connected via a current limiting interface.

8 Claims, 7 Drawing Sheets

(58) Field of Classification Search
USPC ...... 379/30, 93.05, 93.07, 378, 395, 399.01, 379/413; 713/300, 323; 307/18, 140; 323/318; 340/661; 455/115.1

See application file for complete search history.

(56) References Cited

U.S. PATENT DOCUMENTS

| | | | |
|---|---|---|---|
| 5,287,555 A * | 2/1994 | Wilson | H03G 3/3042 |
| | | | 330/278 |
| 5,473,676 A | 12/1995 | Frick et al. | |
| 5,798,578 A * | 8/1998 | Thereze | H02H 1/0061 |
| | | | 307/18 |
| 5,848,150 A | 12/1998 | Bingel | |
| 6,269,154 B1 | 7/2001 | Chellali et al. | |
| 6,522,730 B1 | 2/2003 | Timm et al. | |
| 6,563,864 B1 | 5/2003 | Ibrahim et al. | |
| 6,563,924 B1 | 5/2003 | Cho | |
| 6,671,373 B1 * | 12/2003 | Pang | H04M 19/005 |
| | | | 379/377 |
| 6,724,890 B1 | 4/2004 | Bareis | |
| 6,813,343 B1 * | 11/2004 | Vitenberg | H04M 11/062 |
| | | | 379/377 |
| 7,317,793 B2 | 1/2008 | Binder et al. | |
| 7,580,732 B2 | 8/2009 | Bailey | |
| 7,702,095 B2 | 4/2010 | Binder et al. | |
| 8,107,618 B2 | 1/2012 | Binder et al. | |
| 8,601,289 B1 * | 12/2013 | Smith | H04L 12/10 |
| | | | 713/300 |
| 9,001,974 B2 | 4/2015 | Humphrey | |
| 9,025,744 B2 * | 5/2015 | Humphrey | H04M 11/066 |
| | | | 379/90.01 |
| 9,300,815 B2 | 3/2016 | Cooper et al. | |
| 9,628,283 B2 * | 4/2017 | Cooper | H04M 19/08 |
| 9,628,610 B2 * | 4/2017 | Hsu | H04M 3/007 |
| 9,774,403 B2 * | 9/2017 | Gao | H04B 10/807 |
| 9,794,076 B2 * | 10/2017 | Zhang | H04L 12/12 |
| 2003/0179818 A1 | 9/2003 | D'Angelo et al. | |
| 2004/0151305 A1 * | 8/2004 | Binder | H04M 9/08 |
| | | | 379/413 |
| 2004/0179662 A1 | 9/2004 | Bremer et al. | |
| 2004/0181698 A1 * | 9/2004 | Williams | G06F 1/28 |
| | | | 713/300 |
| 2010/0328087 A1 * | 12/2010 | Kanno | H04M 11/062 |
| | | | 340/661 |
| 2013/0163732 A1 * | 6/2013 | Humphrey | H04L 12/2898 |
| | | | 379/93.07 |
| 2013/0214759 A1 * | 8/2013 | Chen | H04L 12/10 |
| | | | 323/318 |
| 2013/0219204 A1 * | 8/2013 | Chen | H04M 1/738 |
| | | | 713/323 |
| 2013/0251114 A1 * | 9/2013 | Humphrey | H04M 1/738 |
| | | | 379/30 |
| 2015/0381288 A1 * | 12/2015 | Gao | H04L 12/10 |
| | | | 307/140 |
| 2016/0164687 A1 | 6/2016 | Cooper | |
| 2016/0330334 A1 * | 11/2016 | Cooper | H04M 19/08 |
| 2017/0272581 A1 * | 9/2017 | Cooper | H04L 12/10 |

FOREIGN PATENT DOCUMENTS

| | | |
|---|---|---|
| EP | 1079589 A2 | 2/2001 |
| EP | 2362626 A1 | 8/2011 |
| FR | 2896935 A1 | 8/2007 |
| FR | 2933835 A1 | 1/2010 |
| GB | 2445212 A | 7/2008 |
| WO | WO0106751 A1 | 1/2001 |
| WO | WO2005043880 A1 | 5/2005 |
| WO | WO2008132428 A1 | 11/2008 |
| WO | WO 2009/138711 A1 | 11/2009 |
| WO | WO2009138710 A1 | 11/2009 |
| WO | WO2009138711 A1 | 11/2009 |
| WO | WO2010082016 A1 | 7/2010 |
| WO | WO 2012/032309 A1 | 3/2012 |
| WO | WO 2012/069788 A1 | 5/2012 |

OTHER PUBLICATIONS

Application and File History for U.S. Appl. No. 13/821,923, filed Mar. 8, 2013. Inventors: Humphrey.

Application and File History for U.S. Appl. No. 14/907,183, filed Jan. 22, 2016. Inventors: Cooper.

Search Report, European Application No. EP13250085, dated Jan. 7, 2014, 1 page.

International Search Report and Written Opinion, for PCT Application No. PCT/GB2014/000214, dated Aug. 5, 2014, 7 pages.

ETSI, "Access, Terminals, Transmission and Multiplexing (ATTM); European Requirements for Reverse Powering of Remote Access Equipment", ETIS TS 101 548 V1.1.1, Sep. 2014, 30 pages.

Alcatel-Lucent, "Reverse power feed start-up protocol," European Telecommunications Standards Institute (ETSI) (Aug. 23, 2013), XP014157965: pp. 1-4.

BT Group PLC, "Reverse power feed state machine for start-up," European Telecommunications Standards Institute (ETSI) (Feb. 27, 2013), XP014156153: pp. 1-2.

Extended European Search Report for corresponding EP App No. 13250132.1 dated May 19, 2014; 6 pages.

International Search Report for corresponding International Application No. PCT/GB2014/000527 dated Mar. 9, 2015; 3 pages.

Written Opinion for corresponding International Application No. PCT/GB2014/000527 dated Mar. 9, 2015; 5 pages.

\* cited by examiner

METHOD AND APPARATUS FOR USE IN SUPPLYING POWER OVER A TELEPHONE LINE

RELATED APPLICATIONS

The present application is a National Phase entry of PCT Application No. PCT/GB2014/000527, filed on 24 Dec. 2014, which claims priority to EP Patent Application No. 13250132.1, filed on 31 Dec. 2013, which are hereby fully incorporated herein by reference.

TECHNICAL FIELD

The present disclosure relates to a method and apparatus for use in supplying power over a telephone line comprising a twisted copper pair.

BACKGROUND

An anticipated development of broadband access networks is for Access Nodes (AN's), providing high speed broadband connections to end users via short twisted copper pair telephone lines, to be located at points (e.g. drop points) having no easy access to a mains power supply, and being connected to an Exchange building via an optical connection. In such a deployment, one possible known way of providing electrical power to the AN's is for Customer Premises Equipment (CPE) devices to include a power supply unit known as a reverse power supply unit which is designed to provide power to the AN over the same twisted copper pair used to transmit data to and from the CPE device and the AN. The International Telecommunication Union (ITU) is developing a standard for such an approach under the project name G.Fast.

In such arrangements, the reverse power supply unit often supplies the power by means of a direct current (dc) constant voltage supply from which the AN can draw up to a predetermined amount of electricity for its power needs. Such systems also typically include an Analog Telephone Adapter (ATA) unit which enables conventional telephone devices which expect a standard "analog" interface to the telephone network (e.g. to the Public Switched Telephone Network (PSTN) in the UK via a conventional PSTN "British Telecom socket" adapted to receive a conventional BS 6312 jack also known as a "British Telecom plug" or via an RJ11 type plug, etc.) to operate in such a system. The ATA unit typically provides a socket into which the conventional telephone device can connect and the ATA simulates the behavior of a conventional analog interface to a telephone network such as the British PSTN.

Prior patent applications of the present applicant (see copending published PCT applications WO2012069788 and WO2012032309) describe systems including special "dongle" devices which can operate in such a system to enable conventional devices to be connected to a user's existing extension sockets (via suitable dongles). In such an environment, the user's extension sockets and master socket (customer/user premises side) and the wiring between these sockets form the user's internal "home wiring". The dongles operate (together with a cooperating specially adapted ATA unit) to convert any signals or other behavior (e.g. a telephone device presenting a low dc resistance to the socket when transitioning to an "off-hook" state) which are inappropriate for transmission over wiring which is carrying a reverse power supply, into or from alternative signals which are appropriate for carrying over such wiring (or they may act to switch such signals onto or from alternative physical channels—for example spare additional wires within the user's home wiring). In this way, the prior inventions permit the existing home wiring to be re-used and all that is required is that the ATA device and the conventional telephones (these latter via the special dongles) are connected to the user's existing home wiring via the sockets provided in the user's existing home wiring.

Although most conventional telephone devices in use today have their own power supply, the conventional PSTN interface is still able to supply a modest amount of power as a legacy from earlier telephone devices which did not have their own power supply and had to draw all of their power needs from the public telephone network, the largest power requirement being that needed to generate a ring (originally by means of an electro-mechanical bell). Conventional telephone devices still expect therefore to be able to draw a modest amount of power from the interface to which they expect to connect via the telephone lead, and expect that if they present a low dc interface (the typical behavior when the device transitions to an off-hook state) they will receive a small current (sufficient to operate a conventional unpowered telephone device). Any dongles (or other arrangement) therefore which permit a user to connect a conventional telephone device to the user's home wiring in a case where a reverse power system is in place between a user premises and an AN that requires reverse powering should be designed to permit such a small amount of power to be drawn, but no more, even when the device presents a low dc resistance.

A potential problem with such an arrangement, however, is that a user may incorrectly connect a conventional telephone device to the user premises home wiring not via a suitable dongle, or in some other uncontrolled way which means that the device is directly connected onto wiring which is providing a reverse power to an AN (which is also connected to that wiring but is remote from the reverse power supply unit). In such a case, the device could present a low dc resistance to the home wiring (and therefore the reverse power supply unit) with the result that the conventional device draws such a large current that the device is damaged, or, in a worst possible case, becomes sufficiently hot that it becomes a fire hazard, etc.

ETSI Contribution document ATTMTM6(13)000089 "Reverse Power Feed start-up protocol" by Christophe Gendarme and Francois Fredricx both of Alcatel-Lucent, dated 23 Aug. 2013, describes a proposed procedure for guaranteeing proper interaction between the key elements of a Reverse Power Feed system. The document specifies that the Power Source Equipment (PSE) should "continuously check for directly connected (without adaptor) off-hook phones on the home network and back off in case of detection." It also specifies that during start up of reverse powering, "The PSE first checks that there is no off-hook phone, signals that it requests to apply RPF, and waits for the disappearing of any voltage on the line (covering the POTS case) and then the presence of a ready signaling from the DPU (covering the case without POTS) before applying RPF." It then goes on to further specify that "The low power mode prior to the full RPF applies a voltage and current that is safe for directly connected off-hook phones and serves two goals; detection of off-hook phones (new line) provide some bootstrap power to the DPU . . . . Checking for presence of off-hook phones must be continued during the normal RPF operation." From the above comments, it is clear that this document addresses the same issue as addressed by the present disclosure but it does not specify how to determine whether a directly (i.e.

not via a dongle) connected telephone device is connected to the home wiring set over which a reverse power feed is being supplied or not.

SUMMARY

According to a first aspect, there is provided a reverse power supply unit for supplying electrical power from a customer premises device to an access node via a twisted copper pair (which may also when in use carry a broadband signal which in turn may include Voice Over Internet Protocol (VOIP) signals carrying a digitized version of signals generated by a conventional telephone device connected to the twisted copper pair via a suitable interface device such as a dongle), the reverse power supply unit including a rate of change of current detector operable to detect if the current drawn from the reverse power supply unit over the twisted copper pair increases at a rate which exceeds a predetermined threshold and a current limiter for limiting the amount of current supplied by the reverse power supply unit in the event that the rate of change of current detector detects an increase in current at a rate which exceeds the predetermined threshold amount.

The use of a rate of change of current detector is advantageous compared to using a magnitude of current detector because a large number of telephone devices connected via proper dongles could still falsely trigger a magnitude of current detector, whereas for a rate of change of current detector, it is possible to include in each element of the system (e.g. dongles for safely connecting telephone devices to the home wiring and the access node) a rate of change of current limitation device which limits the maximum rate of change of each such device by a sufficient amount to make a false detection almost impossible in any realistic system (i.e. having less than a predetermined number of correctly connected devices—one can perhaps assume that no more than say 10 correctly connected devices at any one time can start to draw power simultaneously thus resulting in a rate of change of current draw of 10 times the maximum rate of change of current draw to which each correctly connected device is limited).

The current limiter may operate to simply switch off the reverse power supply altogether, or it may act to place a non-zero limit on the amount of current consumed. In addition, the power supply unit preferably includes an alarm to indicate to a user that there is a problem—e.g. by displaying a red LED or via some other suitable mechanism. The power supply unit may continually periodically retry to supply power over the wiring until it detects that the problem appears to have been removed or it may wait until the user resets the device (having hopefully fixed the problem).

A further option is to resume powering as soon as the problem appears (from current consumption considerations) to have been resolved but to keep the unit in a mode which indicates to the user that there is still a problem in order to encourage the user to investigate the cause of the problem and fix it if possible (rather than just to permit powering only when a mis-connected telephone device is in an on-hook state). To further encourage this (investigation and problem fixing by the user), the modem device associated with the PSU may disable or restrict Internet access until the user indicates that the problem has been fixed. This could for example be implemented via a captive portal web site either provided locally by the modem device (e.g. as part of the modem's web-based user interface, etc.) or it could be a network based captive portal controlled by a network operator with tips and advice for investigating and resolving the problem (e.g. encouraging the user to check that all necessary dongles have been correctly fitted, etc.).

In order to cope with the case that there is an incorrectly connected device which is in an off-hook state already present on the wiring when the reverse power supply unit powers up, the power supply unit (PSU) advantageously includes a current detector—in addition to the rate of change of current detector (of course the current detector and the rate of change of current detector may be formed as a single combined unit which uses certain common components in performing both functions)—for detecting if the current magnitude exceeds a predetermined threshold current magnitude. In such an arrangement, the power supply unit may monitor both the current detector and the rate of change of current detector in order to identify a profile of current consumption which is consistent with an incorrectly connected telephone device. For example, if within a predetermined period of time from powering up, the current exceeds a predetermined magnitude, then this may be taken as indicative of a misconnected device being present on the wiring somewhere (and already in an off-hook state) and cause the PSU to enter its "fail" mode as it would if the rate of current detector detected a surge in current (indicative of a mis-connected device transitioning from an on-hook to an off-hook state) after the predetermined period of time after start-up of the PSU. Naturally, this mechanism (of detecting an excessive current flowing from the PSU within a predetermined period of time from start up) would also often be the one used when the PSU is automatically attempting to restart from its fail mode in embodiments where such behavior is exhibited by the PSU.

Advantageously, the alarm, as well as indicating to a local user that the PSU has entered into a fail mode, is also operable to communicate with the remote Access Node (AN) that it has entered such a fail mode so that the AN knows why a power failure (from its perspective) has occurred. Such an alarm indication could be transmitted within an operations and maintenance channel operating between the CPE modem and the corresponding modem at the AN. Alternatively, in addition, the alarm indication could be provided by a simple predetermined modulation of the power signal itself—advantageously occurring at a frequency which would not be entirely blocked by the misconnected device presenting a low dc impedance to the line.

Customer premises equipment including a reverse power supply unit according to the first aspect advantageously further includes a current limit arrangement for connection to a customer premises wiring in such a manner as to limit the amount of current which can be drawn by a telephony device connected to the customer premises wiring to be no greater than a predetermined amount. The customer premises wiring can be connected to the twisted copper pair in such a manner that voice signals can be transmitted from the telephony device to the access node to which the twisted pair is connected. The manner in which this connection is made can be different in different embodiments or reverse power scenarios. For example, the connection could be an indirect one in which an Analog Telephony Adapter (ATA) transmits and receives analog telephony signals with the telephony device via the customer premises wiring, but the voice signals are converted to or from digital Voice over Internet Protocol (VOIP) type signals before being communicated as broadband signals (e.g. XDSL or G.FAST signals—usually as just a small part of a much greater possible bandwidth available for carrying large rates of data of up to several tens or hundreds of megabits per second between the co-operating modems) over the twisted copper pair between cooperating broadband modems. Alternatively, the analog telephony signals could be carried as such directly over the copper pair (typically together with such broadband signals) to a splitter arrangement located at a drop point where an ATA converts the analog telephony signals into VOIP type signals for transmission over a broadband signal path within the access network. In the indirect case there are two principal types of arrangement, one where the customer premises wiring is effectively disconnected from the twisted copper pair at dc such that it does not carry the reverse power feed signal, and one where it is not so disconnected such that it does carry the reverse power feed signal.

In both the direct and the indirect cases there may therefore be arrangements in which the reverse power feed signal is carried over the customer premises wiring and in such arrangements, special dongles are required to be interconnected between the customer premises wiring and the telephony device in order to protect it from drawing too much current when it is in an off-hook state (the most current that a conventional telephony device would expect to draw from an access network when in its off hook state is typically of the order of 100 mA or less since most of the resistances, other than its own internal resistance, dictating the amount of current flowing would typically be much greater than its own internal resistance, thus reducing the voltage seen by the device when drawing current from the access network to only about 8-12 Volts compared to the 60-75 Volts or so typically seen by the device when offering a high resistance when in its on-hook state). Such dongles constitute the current limit arrangement referred to above in such cases. In other cases where no dongles are required because the customer premises wiring is isolated from the reverse feed power supply signal, the equipment causing this isolation constitutes the current limit arrangement (note that in such cases the ATA generally needs to supply a certain level of current to the device when it is in an off-hook state (simulating the behavior of a typical access network by simulating the presence of (or actually providing) internal resistance in the ATA to limit the actual current drawn by the device to less than 100 mA) and since this current may itself ultimately be drawn from the same power supply unit as is providing the reverse feed power supply signal, it functionally corresponds quite closely to the other cases in practice).

Advantageously, the Access Node (AN) (which is also known as and hereinafter referred to as an Access network Unit (ANU)) is configured to draw power in a manner controlled to ensure that the rate of change of current demanded by the remote ANU is limited. The power extraction/combiner circuitry built into the ANU therefore can ensure that the positive rate of change of current demand for an individual circuit does not exceed a specific value (for any normal operating conditions of the ANU). This could be implemented by adding inductance at the ANU thus ensuring that the rate of change of current demanded by the ANU cannot exceed a specified value (within a specified voltage range). In this way, if it is known, for example, that the maximum rate of change of current rise demanded by the ALU sink is set to, say, 150 mA/s and the power insertion PSU in the customers' premises detects a demand of rate of change of current change of say 500 mA/s then it may be deduced that a fault condition has occurred and the PSU should shut down. Note that in some embodiments the threshold rate of change of current needs a reasonable margin (e.g. 500 mA/s-150 mA/s as per above example) since other devices could also legitimately consume some power from the wiring—for example correctly connected telephone devices—and it is possible that they could start consuming such power at the same time as a remote ANU even though this is somewhat unlikely in practice.

Advantageously any dongles for use in certain embodiments should also be limited (e.g. by use of an inductance) in a similar manner to the ANU as described above. For example the dongles could also limit the maximum rate of change of current draw to not exceed 150 mA/s. In this way, more than 3 devices (e.g. 4 dongled telephones or 3 dongled telephones and the ANU) would need to start drawing power at their maximum permitted rate at exactly the same time for an overload to be detected (assuming a threshold of 500 mA/s as set out above)—naturally this is a very unlikely event.

A second aspect therefore relates to an access network unit for use with the reverse power supply unit of the first aspect including a rate of change of current limitation device. Advantageously the rate of change of current limitation device has one or more of the following properties (each of which gives rise to its own technical advantage whether used in combination or in isolation compared to prior art known ANU devices): a maximum rate of change of current draw of less than 150 mA/s when connected to a 50V dc power supply; and/or the inclusion of a gyrator for performing the rate of change of current limitation providing a predetermined inductance in order to provide a predetermined maximum rate of change of current draw when increasing its power consumption from a specified dc power source.

A third aspect relates to a dongle for use in connecting a telephone device to a user's home wiring such that the home wiring can be used for carrying a reverse power signal (e.g. a 50V dc signal) from a reverse power supply unit according to the first aspect to a remote ANU, wherein the dongle includes a rate of change of current limitation device. Advantageously the rate of change of current limitation device has one or more of the following properties (each of which gives rise to its own technical advantage whether used in combination or in isolation compared to prior art known ANU devices): a maximum rate of change of current draw of less than 150 mA/s when connected to a 50V dc power supply; and/or the inclusion of a gyrator for performing the rate of change of current limitation providing a predetermined inductance in order to provide a predetermined maximum rate of change of current draw when increasing its power consumption from a specified dc power source. The relatively low limit on the maximum rate of change of current consumption means that it is relatively easy for a detector to identify if an incorrectly connected device has been connected to wires carrying a reverse power feed. The use of a gyrator enables a relatively large effective inductance to be generated without requiring the use of a physically large inductor which is particularly advantageous when used with a relatively small dongle device.

According to a fourth aspect, there is provided a system comprising a customer premises equipment device (e.g. a type of Home Hub as supplied by British Telecommunications PLC) and a remotely connected Access Network Unit (ANU) according to the second aspect, the customer premises equipment device including a broadband modem and further including a reverse power supply unit according to the first aspect, wherein the consumer premises equipment device is connected to the remote ANU via a twisted copper pair telephone line between the user's premises and the remote ANU which is powered (at least partially), when in use, by means of the reverse power supply unit. Embodiments according to this fourth aspect may include a filter arrangement, possibly in the form of an interstitial plate or a replacement front plate for use in a master socket of a user's premises, which ensures that the whole of a user's home wiring is connected to an analog presentation port of an Analog Telephone Adapter (ATA) unit, whilst the broadband modem and reverse power supply of the customer premises equipment device are connected directly to the outgoing copper pair and not (directly) to the user premises home wiring. The advantage of this sort of embodiment is that the user's home wiring does not carry a reverse power supply and there is no need for the user to ensure that each device connected to the home wiring is connected via a dongle.

According to a fifth aspect, there is provided a system comprising: a consumer premises equipment device including a broadband modem and further including a reverse power supply unit according to the first aspect; an Access Network Unit, ANU, according to the second aspect; and one or more dongles according to the third aspect; wherein the customer premises equipment device and the one or more dongles are connected to a home wiring arrangement which is also connected to a twisted copper pair telephone line at a user premises end thereof and wherein the ANU is connected to the twisted copper pair telephone line at an ANU end thereof which is distal from the user premises end. In embodiments according to the fifth aspect, no change is made to the user's master socket and consequently a reverse power signal is carried over the user's home wiring arrangement in order to provide power, when in use, to the remote ANU. In such embodiments it is important for the dongles to prevent excess current from being drawn by telephone devices connected to the dongles (note that the dongles provide an analog presentation port for connection into by telephone devices). The advantage of such embodiments is that no change at all is required to be made to the user's home wiring or master socket. The disadvantage is that if such home wiring includes bridged taps, etc., it may reduce the rate of data that can be transmitted and/or received over the broadband connection and in any event, the user must remember to connect every device connected to the home wiring via a suitable dongle.

A sixth aspect relates to a method of detecting an inappropriately connected telephony device in a system comprising a reverse power supply unit for supplying electrical power over a twisted copper pair telephone line from a user's premises to an access node unit, the method comprising detecting a consumption of current from the reverse power supply unit consistent with a telephony device being in or transitioning into an off-hook state when inappropriately connected to the twisted copper pair telephone line when it (the twisted copper pair telephone line) is carrying a reverse power supply feed from the reverse power supply unit.

In this context, inappropriately connected may mean being directly connected to the twisted copper pair telephone line (or being connected via some home wiring (e.g. a user's home telephony extension wiring)), rather than being connected only via a suitable interfacing filter means such as a dongle, or via an interstitial plate connected within a user's master telephone socket, etc. Thus inappropriately in this context means being connected to wiring in such a way that when it is carrying a reverse power supply signal in order to power a remotely connected access node, there is no interface means connected between the reverse power carrying wiring and the inappropriately connected telephony device to prevent the inappropriately connected telephony device from drawing a large current (by which is meant of the order of an Amp or greater) in the event that it presents a low impedance typical of that which is presented by a conventional telephone device when it is in an off-hook state. The term telephony device includes, in the present context, in addition to telephone units, other telephony-related devices such as fax machines, etc.

BRIEF DESCRIPTION OF THE DRAWINGS

In order that the present disclosure may be better understood, embodiments thereof will now be described, by way of example only, with reference to the accompanying drawings in which.

DETAILED DESCRIPTION

Figure 1:
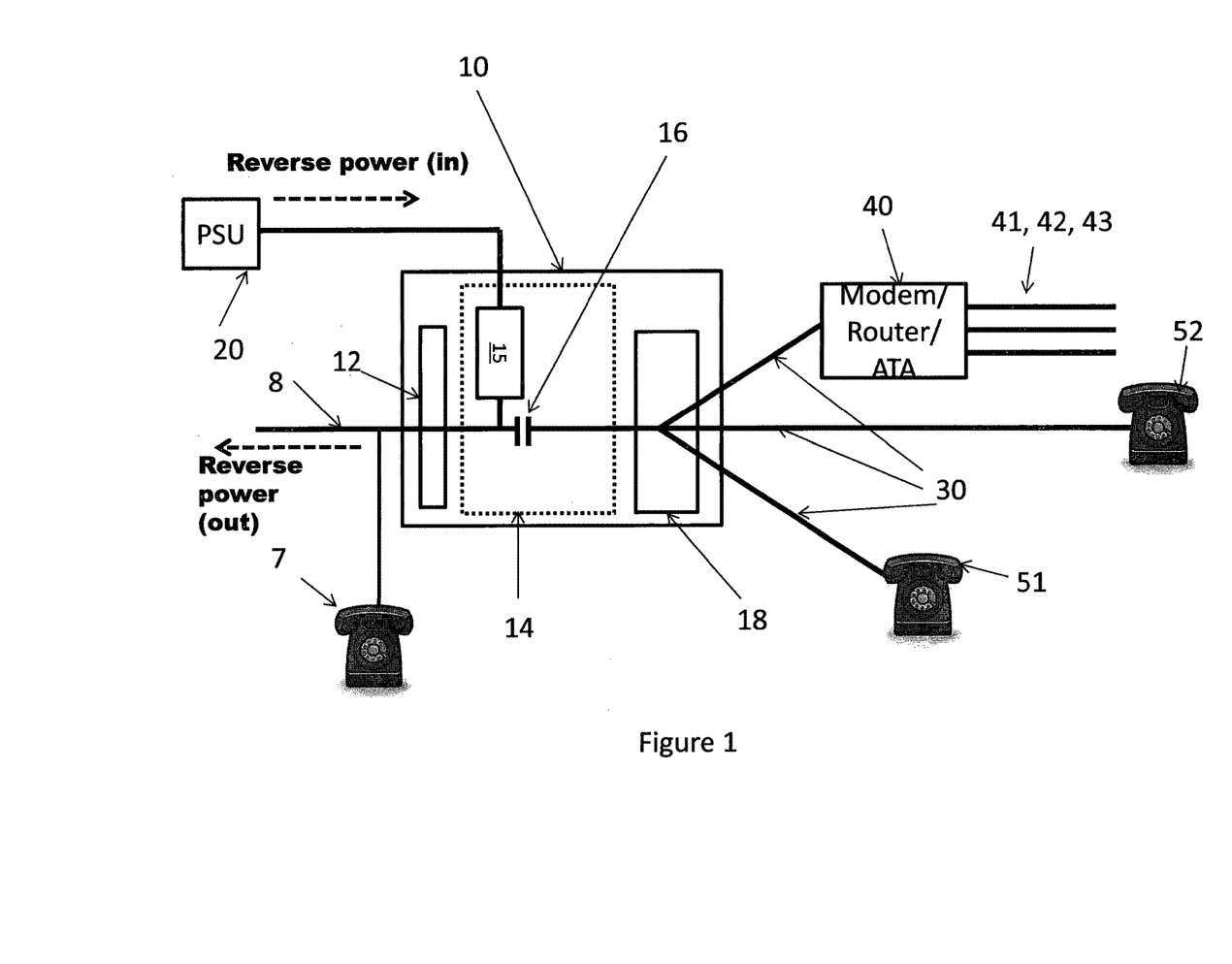
FIG. 1 is a schematic overview of a telephony system according to an embodiment incorporating a reverse power supply unit, a user's home wiring arrangement including a master socket into which has been fitted an interstitial plate defining a network side to the left (in FIG. 1) of the interstitial plate and a user side to the right of the interstitial device (in FIG. 1), various telephony devices connected to the user's home wiring arrangement at a user's side thereof, an analog telephone adapter (ATA) unit also connected to the user's home wiring arrangement at the user's side thereof and an inappropriately connected telephony device connected directly to the network side.

FIG. 1 illustrates a Fiber-to-the-Distribution Point (FttDP) system when operated under an 'isolation' model. As can be seen from FIG. 1, a twisted copper pair 8 enters a user's premises from a remote (not shown) access node which may be a drop point unit, and is connected to a master socket 10. The master socket 10 includes a back plate 12 and a front plate 18. In this embodiment, an interstitial plate 14 is also fitted at the master-socket 10 (an NTE5 master socket from British Telecommunications plc in this example) which effectively isolates the network cabling (i.e. principally the twisted copper pair drop wire 8), to which a reverse power signal is applied from a Power Supply Unit 20, from the home network cabling 30 (i.e. the majority of the in-premises extension wiring) at direct current (d.c.) frequency, by means of a d.c. blocking capacitor 16. As shown in FIG. 1, the reverse powering system (in particular the reverse Power Supply Unit (PSU) 20) provides d.c. power along the A&B twisted copper pair to an Access Network Unit (ANU) (also referred to as a Drop Point Unit (DPU) or an Access Node (AN)) which, although not illustrated in FIG. 1, is illustrated in FIGS. 2-5. As mentioned above, this d.c. power is blocked by the d.c. blocking capacitor 16 in the interstitial plate 14 so that it does not appear on (i.e. it is isolated from) the in-premises home network wiring 30.

In the case of FIG. 1, no reverse-power-feed-isolating dongle is required by any telephone connected to the in-premises wiring 30 since it is "fed by" an Analog Terminal Adapter (ATA) 40 on the user-side of the d.c. blocking capacitor 16 ("fed by" here means that the wiring 30 is directly connected to the analog presentation port of the ATA such that all telephony devices also connected to the user's home telephone extension wiring (i.e. the in-premises wiring) 30 are effectively also directly connected to the analog presentation port of the ATA 40). It should, however, be noted that it may be beneficial to include conventional DSL splitter dongles prior to the telephony devices 51, 52 in the conventional manner (note that the modem/router/ATA 40 can include a built-in filter to separate DSL signals from POTS signals as necessary) primarily so as to prevent noise from the telephony devices 51, 52 from interfering with the DSL modem of the modem/router/ATA 40 in the normal manner. The Modem/Router/ATA 40 provides various ports to supply broadband to the end user illustrated by the lines 41, 42, 43: these could include, for example various Ethernet connection ports, a Wi-Fi access point, etc.

As shown in FIG. 1, the interstitial plate also includes a differential mode balanced choke 15 for filtering out any high frequency noise coming from the PSU by isolating the PSU and any associated wiring from the twisted copper pair at frequencies above a predetermined frequency dependent upon the choke 15, such as to substantially block all signals at frequencies in excess of at least a few hundred Hz, and certainly in excess of a few kilohertz (where the DSL signals start) so as to prevent any noise interfering with DSL signals or similar high frequency DMT broadband signals being carried over the twisted copper pair 8.

Also shown in FIG. 1 is a telephone 7 connected to the 'wrong' (network) side of the master-socket 10. Such a telephone could have been accidentally mis-wired and/or deliberately wired in this fashion for convenience. Under normal POTS/broadband operating conditions this is of little consequence—although there would be no bell signal for this telephone this is of little consequence with most modern telephones. However, under reverse-powered conditions (as required for many Fiber to the Drop Point (FttDP) scenarios), this is of potentially significant consequence, since, although whilst the telephone 7 remains on-hook it presents a high impedance and thus draws little d.c. current, when this telephone 7 goes off-hook it becomes (in common with many other kinds of telephony devices such as fax machines etc.) low-impedance and can thus very quickly (constrained only by the inductance of the in-premises wiring, the internal inductance of the telephone 7 and the internal inductance of the reverse power supply) draw a large amount of current—quite possibly sufficient current to destroy the device 7 and maybe even start a fire!

Figure 2:
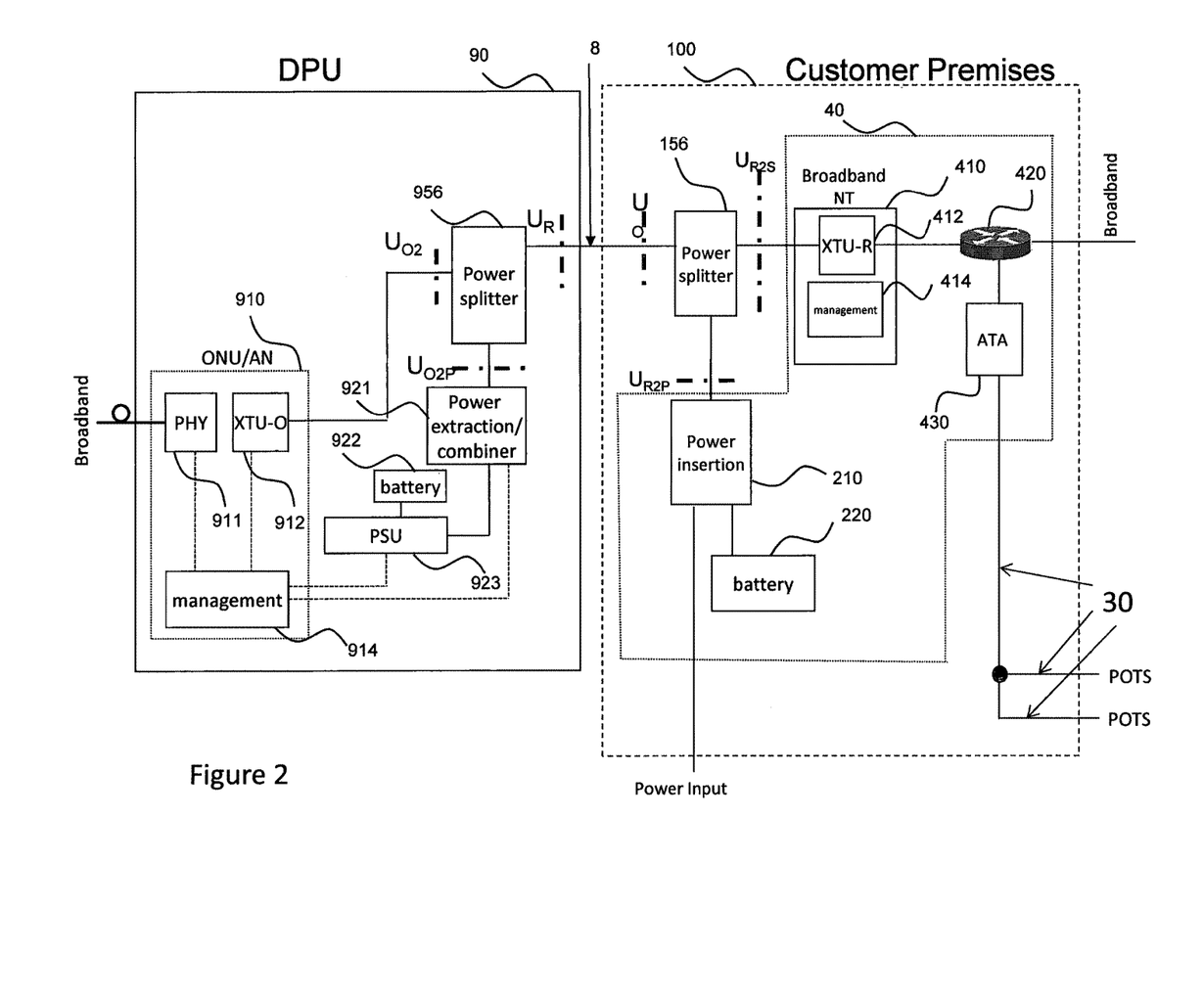
FIG. 2 is a schematic overview of a telephony system according to a second embodiment including a user's home wiring, an ATA unit and various connection points for connection to one or more telephony devices, but also illustrating a drop point to which a telephony line is connected.

FIG. 2 shows a similar arrangement to that of FIG. 1 described above, but in reference-model format, and wherein the need for even conventional POTS type splitters has been removed by isolating the entirety of the user premises wiring from any broadband signal carrying wiring. This can be achieved by providing a direct connection from the DSL modem to an interstitial plate within the user's master socket, where the extension wiring (including the user accessible port of the front plate of the master socket) is not connected to the back-plate of the master socket (and thus to the twisted copper pair of the access network) (except via the ATA/modem device which converts between analog telephony signals at POTS frequencies and VOIP signals carried as digital information within the broadband signal transmitted between the user's DSL modem and the corresponding DSL modem in the access network). Note that as an alternative to effectively completely breaking the electrical connection between the incoming twisted copper pair and the extension wiring, a similar effect can be achieved by providing a suitable filter (such as a conventional ADSL splitter filter) to filter out any broadband signals from being carried through from the broadband signal carrying wiring (i.e. the DSL modems/twisted copper pair/back-plate of the master socket) to the user's extension wiring (which solely carries analog telephony/POTS signals).

As shown in FIG. 2, twisted copper pair 8, connects between a Customer Premises 100 and a Drop Point unit (DPU) 90. Within the customer premises, there is a power splitter arrangement 156 which is basically a capacitor and a choke arranged as in FIG. 1 (see choke 15 and capacitor 16 of FIG. 1). In addition there is a collection of elements all of which are illustrated as being contained within a single device housing indicated by the dotted line 40. This represents that in the present embodiment a single device 40 (the modem/router/ATA device) contains the various elements illustrated within this dotted line. Of course in other embodiments, the elements could be differently housed in different housings, however an advantage of containing all of the illustrated elements 410, 420, 430, 210 and 220, as is done in the present embodiment, is that they can share the same management controller 414 which can manage all of the principal elements of the device especially the modem (the XDSL Transmission Unit-Remote (XTU-R) 412 in the present embodiment), the router 420, the ATA 430 and the Power insertion unit 210 (corresponding to the PSU 20 of the embodiment illustrated in FIG. 1). Also shown in FIG. 2 is that the device 40 includes a battery for providing a short period of continuance in the event of a sudden power loss from the user's premises (e.g. as a result of a power-cut or user power disconnection, etc.) in order to allow a controlled shut down of the system in the event of power loss at the user premises. The solid line box 410 encompasses the modem 412 and the management controller 414 and is conventionally termed a broadband Network Termination unit (NT). The management controller 414 is shown as contained within the NT 410 despite managing numerous other elements as well because the majority of its functionality is associated with controlling the modem 410 as is well known in the art.

FIG. 2 also illustrates the DPU 90 in some detail. As shown, in this embodiment, it includes a power splitter 956 which is similar to the power splitter 156 mutatis mutandis such that the low frequency (dc) power signals are blocked by a capacitor from passing through the interface $U_{o2}$ between the power splitter 956 and the ONU/AN 910 whilst the high frequency broadband signals are prevented from passing through the interface $U_{o2P}$ between the power splitter 956 and the power extractor/combiner 921. Additionally, the DPU 90 includes an Optical Network Unit/Access Node (ONU/AN) 910, a power extractor/combiner unit 921, a battery 922 and a Power Supply Unit (PSU) 923. The ONU/AN 910 includes a backhaul termination unit (PHY)

911 which in the present embodiment is a an Optical Network Unit 911 connecting to an optical fiber forming part of a Passive Optical Network (PON) arrangement feeding back to a Central Office or similar, etc.; the ONU/AN additionally includes a modem 912 (in the present case an XDSL Transceiver Unit—Central Office side (XTU-O)) which corresponds to the modem 412 in the customer premises; finally, the ONU/AN is additionally shown as containing a management controller unit 914 though as with the customer premises arrangement 100, this management controller actually controls other key elements within the DPU in addition to the ONU and the XTU-O. The power extraction unit extracts power from the reverse power signal generated by the power insertion unit 210 of the customer premises and uses this to power the PSU 923 which in turns provides power in a conventional manner to the other elements in the DPU which require power. The battery 922 provides a small amount of back up power to enable a graceful shutdown in the event that power from the twisted copper pair is cut off for some reason. Further details of such reverse powering arrangements can be found in, for example, WO2009138711, the contents of which are hereby incorporated by reference in their entirety into the present application.

Figure 3:
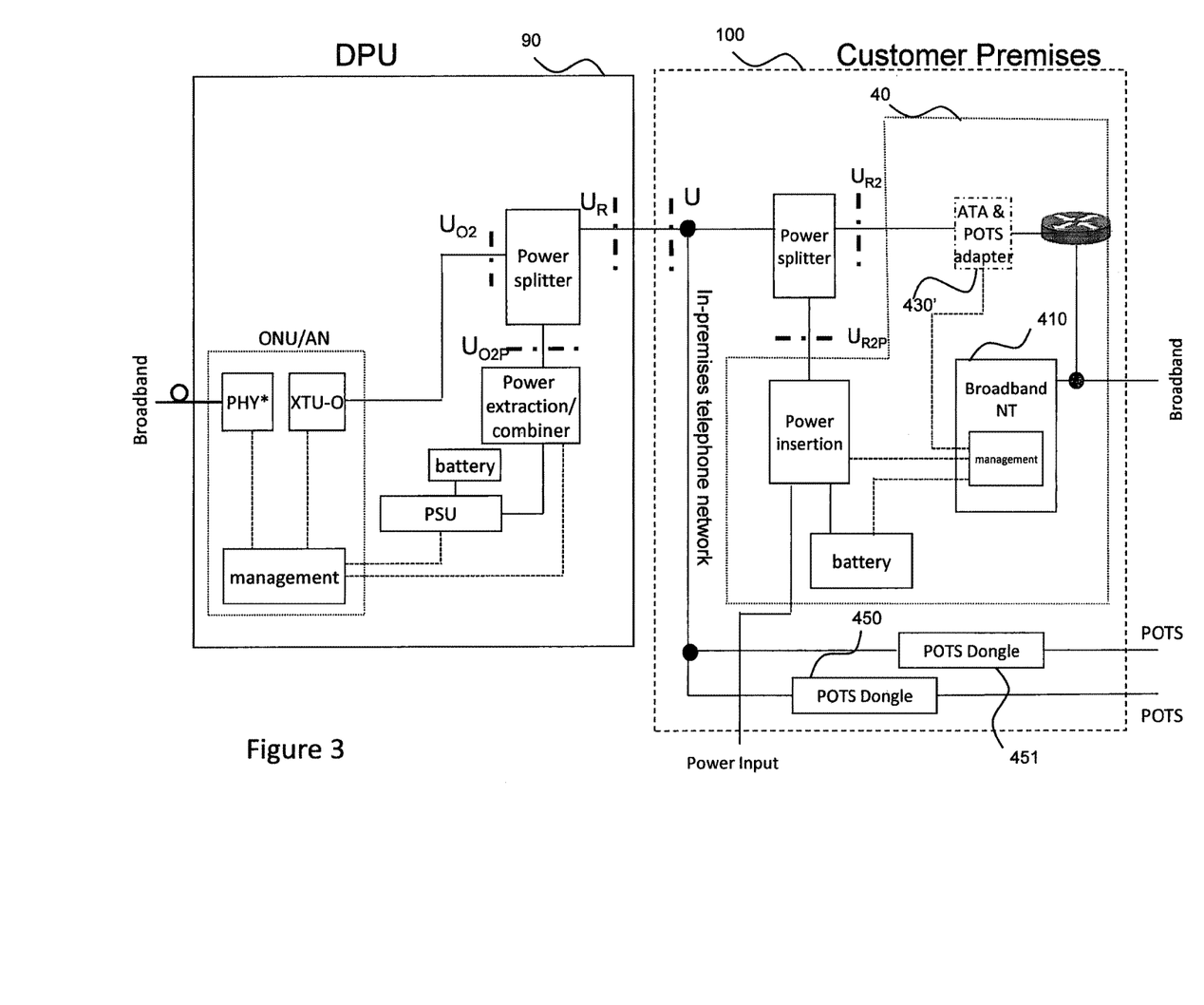
FIG. 3 is a schematic overview of a telephony system according to a third embodiment, which is similar to FIG. 2 but illustrates an embodiment in which the reverse power feed is connected to the user side of the home wiring arrangement and plural dongles are shown for use in appropriately connecting telephony devices to the user side of the home wiring.

FIG. 3 shows an arrangement (in a similar reference model format to that of FIG. 2) where POTS dongles are required on the in-premises network since the dc reverse powering current and POTS share the same wiring infrastructure (in addition the ATA 430' includes a similar POTS adapter with corresponding functionality to the POTS Dongles 450, 451. In such an arrangement, some suitable technique to convert conventional analog telephony dc signals to suitable non-dc signals is required to be performed by the POTS dongles 450, 451 (and the ATA and POTS adapter 430') to enable conventional analog POTS signals to be carried on the same wiring as the reverse power dc signal without causing problems. An example of a suitable approach for performing this is to convert the dc signals associated with ringing and transitioning a telephone device between on and off hook states into corresponding ac signals as described in greater detail in co-pending published PCT patent application WO2012069788. If the POTS dongles were omitted in this embodiment, then the same situation would occur as described by the illegal/inappropriately connected telephone in the cases above (e.g. telephone device 7 in FIG. 1) whereby although it would be of no consequence whilst such a device was on-hook, as soon as it transitions to an off-hook state it would likely almost instantly start drawing a damaging current.

As will by now be clear to persons skilled in the art an important feature of embodiments described herein is that the d.c. reverse power feed power supply (or other associated componentry within the same modem/ata/router device such as a home hub type device, etc.) is designed to detect a "signature" indicative of an inappropriately connected telephony device consuming a dangerously large amount of current from the reverse power feed supply, typically by observing a rapid increase of current being demanded from the reverse power feed power supply (which is determined as being most likely the result of an illegal (i.e. connected directly to the access network side of the divide between access network and user side demarcated by the master socket) or un-dongled (in arrangements such as illustrated in FIG. 3 where POTS dongles are required) telephone device transitioning into an off-hook state). When this takes place (i.e. the signature behavior is observed), in the present embodiment, the reverse power supply switches into a 'fail' mode where an error indicator is illuminated on the power supply and the output voltage/current instantaneously drops to zero, in the present embodiment, until suitable remedial action is taken. In the present embodiment, the system determines that suitable remedial action has been taken suggesting that the inappropriately connected device (e.g. an illegal or un-dongled telephone device) has been either removed or a dongle added etc. by both periodically checking to see if the excessive drawing of current appears to have stopped and by requiring a user to make a positive input to the device (either by pressing a physical button provided especially for this purpose in the present embodiment near the fail mode indicating LED or by interacting (e.g. pressing a similar virtual button) with a Graphical User Interface provided by the device as a web interface to a user's connected PC). (Note that periodically checking to see if the excessive drawing of current appears to have stopped is performed in the present embodiment by periodically (every 20 seconds in the present embodiment) switching back on the reverse feed power supply and looking for an excessive drawing of current—in particular, in the present embodiment, by determining if the magnitude of drawn current exceeds 100 mA within a start-up period of 100 ms—see discussion below of detecting if an illegal/un-dongled telephony device is already in an off-hook state when the reverse power feed supply is initially energized.)

Of course, as mentioned above, it may be possible that an illegal/un-dongled device may be already in the off-hook state when the reverse powering supply is initially energized. In this case there would not be an (almost) instantaneous increase in demand for current that occurs when a device goes off-hook. However, the quiescent current would be significantly higher than the 'normal' current expected at power-up and thus the illegal/un-dongled device can still be detected and the PSU can switch (or remain) in 'fail' mode. Naturally, the process described above is built into a start-up protocol for the reverse powering PSU in the present embodiment.

The operation of this current limit detection system is made possible by limiting the rate of change of current demanded by the remote ANU. The power extraction/combiner circuitry built into the ANU (see FIGS. 2 and 3) should ensure that the positive rate of change of current demand (especially at low frequencies associated with the reverse power feed supply signal) for an individual circuit cannot occur beyond a specific value. This could be implemented by adding inductance at the ANU thus ensuring that the rate of change of current demanded by the ANU cannot exceed a specified value (within a specified voltage range). If it is known that the maximum rate of change of current rise demanded by the ALU sink is say set to 150 mA/s and the power insertion PSU in the customers' premises detects a demand of rate of change of current change of say 500 mA/s then the system of the above described embodiments deduce that a fault condition has occurred and the PSU is shut down (entering the fail mode as described above).

In the presently described embodiments, upon shutting down (entering the fail mode), the PSU in the CPE immediately starts trying to re-negotiate connection with the ANU, i.e. attempting to restore power whilst still displaying the fault condition. During the start-up protocol negotiation between the source PSU and ANU it may be possible to indicate to the management system installed in the ANU that a powering problem exists on that specific line. This information would be useful in order to remotely diagnose the powering problem that has occurred. In the present embodiments, two mechanisms are provided for enabling this communication, firstly a protocol is used for communicating this information as part of an OAM channel carried within the broadband signal carried between the two modems. In addition, the device 430 and DPU 90 employ a very simple protocol based on d.c. or low frequency signals. In particular, for example, the device 430 when in fail mode can vary the periodicity with which it attempts to renegotiate the power supply. These attempts may in many cases be detectable by the PDU (even if the size of any voltage signal to the PDU is much less than output by the reverse feed power supply because most of the power supply signal is absorbed by the mis-connected telephony device) and the interval between attempts can thus be monitored to detect simple pre-arranged messages. For example, noting that the re-negotiation attempts are made every 20 seconds is indicative of the device entering the fail mode because of a detected signature indicative of an illegal/undongled telephony device. Alternatively, to cope with the case that the resistance offered by the misconnected telephony device is so low that no detectable DC signal can be perceived at the PDU, a low frequency ac signal can be periodically sent instead. This should travel past the misconnected telephony device so as to be detectable at the PDU with a suitable simple rectifying circuit associated with the power extractor/combiner element—the frequency should be set sufficiently high that at least a detectable portion of it passes the misconnected telephony device 7 but sufficiently low that at least a detectable portion of it passes the power splitter 956—frequencies in the range of 10-100 hz should suffice for this purpose.

Figure 4:
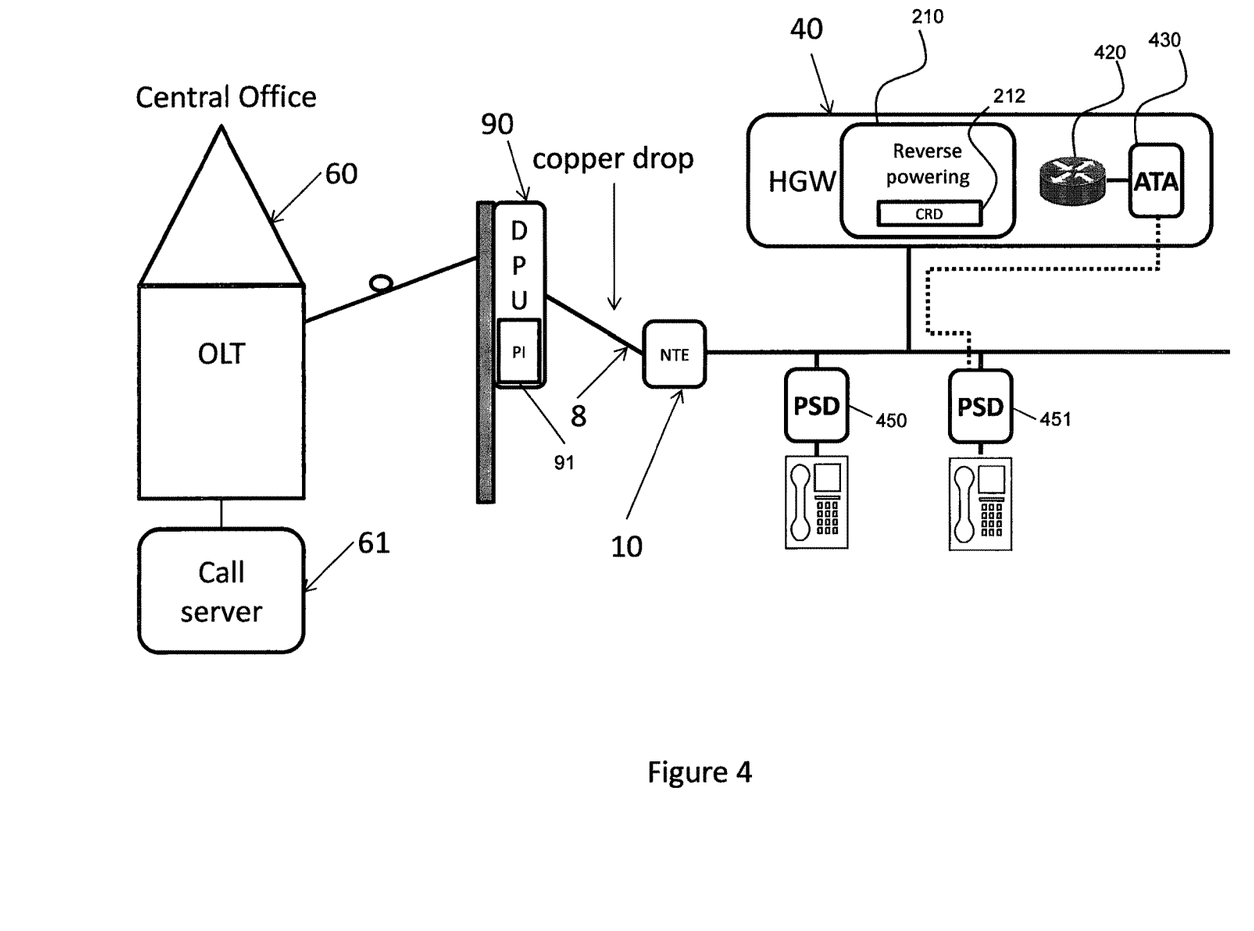
FIG. 4 is a schematic overview of the embodiment of FIG. 3 illustrating how the reverse power supply unit and the ATA unit are fitted in a home hub device, and further illustrating two correctly, appropriately fitted telephone devices, a drop point unit and a central office.

FIG. 4 illustrates in overview where the signature detection function and the current limitation functions discussed above are located in an example scenario/embodiment illustrating a customer premises (all elements 40, 210, 212, 420, 430, 450, 451 to the right of the Network Termination Equipment (NTE)/master socket 10) connected via a twisted copper pair 8 to a DPU 90 which in turn is connected by an optical fiber to a Central Office 60 containing an Optical Line Termination (OLT) unit which in turn is connected to a call server 61. In the reverse powering source 210 (located at the customer's premises as indicated by the NTE 10 demarcating the legal boundary between the access network owned by an access network operator and the customer's wiring) there is a Current Rate Detector (CRD) 212 and in the remote unit (DPU 90 in this case) we have the Predefined Inductance (PI) 91 which provides a guaranteed minimum inductance as perceived by the reverse powering source 210 (and the CRD 212 thereof in particular). The combination of these two units means that it is possible to detect if an unexpected step-change in current demand occurs (phone going off-hook) and/or if the quiescent current demand of the DPU is excessively high (telephone already off-hook at reverse power system initialization).

Figure 5:
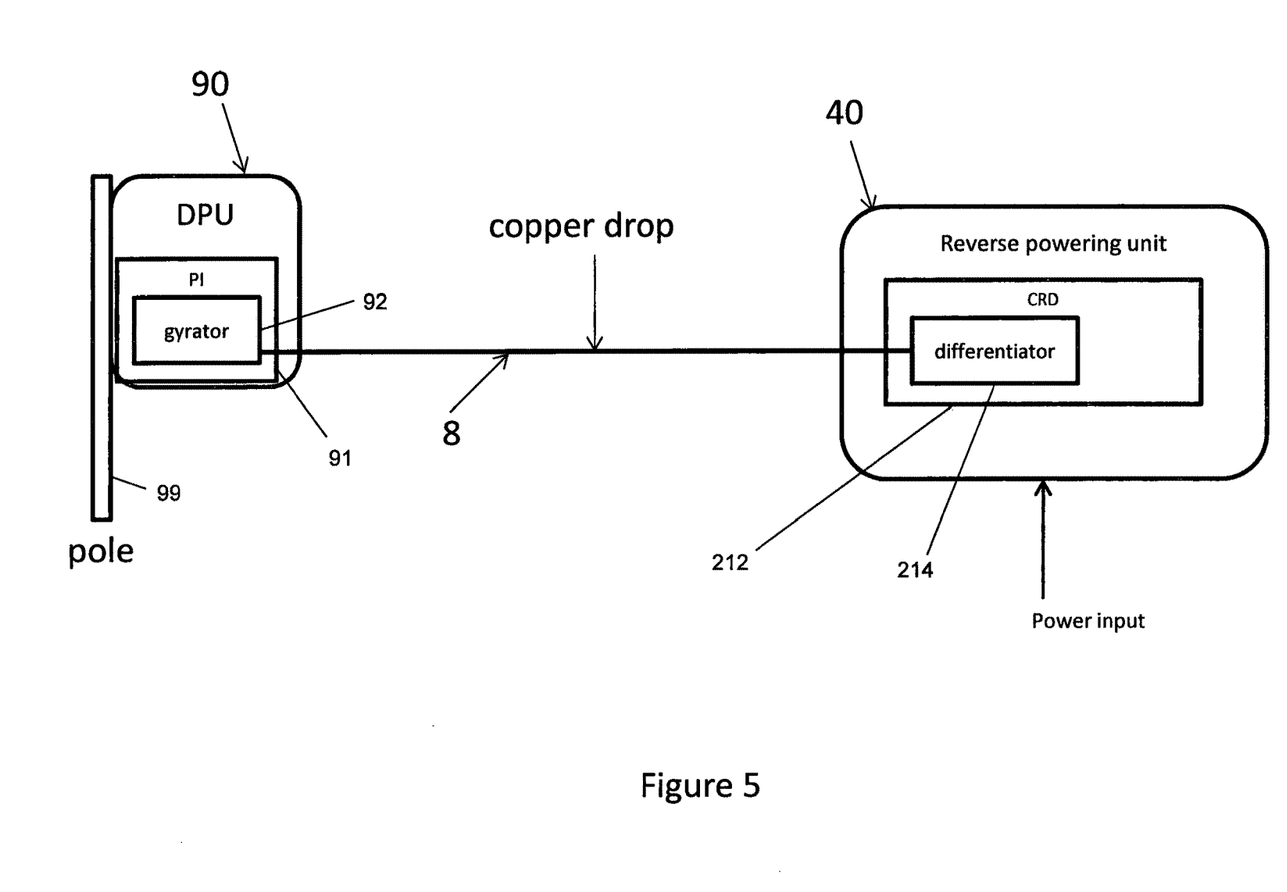
FIG. 5 is a schematic view showing in greater detail the reverse power supply unit and the drop point unit of FIG. 4 in greater detail.

FIG. 5 shows some more detail of the PI 91 and CRD 212. For the PI 91, a gyrator circuit 92 provides an efficient means of setting the input inductance (LG) of the d.c. power extraction/combiner circuit of the DPU 90 (illustrated in this example as being mounted on a pole 99). This inductance value LG would be set to a value that limits the maximum rate of change of input current that could be achieved with the typical voltage available for reverse powering (say 0-60V d.c.). By performing a metallic line test (MELT) at either the DPU or CPE end of the copper-drop, it would be possible to measure the inductance (LM) of the copper-drop. This measured inductance (LM) can therefore be added to the generated (gyrator) inductance (LG) in order to provide a constant inductive load (LR) as perceived by the reverse powering source located at the CPE such that:

$$LR=LG+LM$$

For the CRD 212, in order to detect peaks in demand current consistent with a telephone going off-hook, this can be achieved by a differentiator based circuit (e.g. a simple operational amplifier based differentiator circuit in combination with a voltage detector) monitoring the output voltage of a potential-divider circuit placed at the output of the reverse power feed unit. Alternatively, a simple R/C low-pass filter could be used to filter the output voltage into a threshold detector in order to detect excessive current demand.

An off-the-shelf current detection component could be used to detect the current surge but a differentiator function is required to detect a rapid rise in load current (phone going off-hook) which would be used to trigger the failure mode i.e. switch off the supply to the load and illuminate a warning LED or something similar (e.g. a sound based alarm such as a buzzer or some combination of such warning mechanisms). As is well known, a low-pass filter acts as differentiator—i.e. under steady state conditions the output from the RC filter would be zero however when there is a change in input current (which is simply measured as being proportional to the voltage across a resistor) taken then a voltage spike would be produced on the output of the filter which could then feed either into a comparator circuit where (if the spike is beyond a certain value) it would trigger some logic to switch the supply into failure mode, or the output from the filter could feed into an analog to digital converter (usually several of these built into cheap micro-controllers) and the threshold function can be performed in the digital domain—this latter being the approach adopted in the above described embodiments.

As for a phone being off-hook when the source power supply is initially energized—in such a case the load current upon power-up would be much higher than expected. This provides the motivation for the described embodiment—thus supposing that the power-supply as part of a start-up protocol puts 10V onto the AB pair. Normally the remote unit would provide a 'signature' (such as performed by Power-Over-Ethernet systems) resistance of say 10 k ohms. There will be a few ohms to be added for the resistance of the AB drop-wires but this is insignificant so essentially the PSU is expecting a load current of V=IR which equates to 10 mA. If the start-up current as seen by the source PSU is greater than this then this can be taken by the PSU as an indication that there already exists a fault condition. Thus if at any time during a start up period which can be as short as 100 ms or could be much longer—e.g. a few seconds—an absolute current draw in excess of a suitable threshold amount (set ideally so as to be sufficiently low that no damage will be incurred by an incorrectly connected device)

One additional thing that should be mentioned is the dongles that perform the signaling conversion which should be attached to every phone on this home network. When a phone goes off-hook on a dongled phone there would be a current surge (the same as for an un-dongled phone). However, in this case, the dongle actually adds some inductance (which again could be gyrator circuit based) so that the surge current of a dongled phone is limited much reduced when compared to an un-dongled phone. This means that the differentiator (as mentioned above) would still create a voltage spike but this would be of smaller amplitude for the dongled phone than the un-dongled meaning that the threshold setting would 'catch' the un-dongled phones but allow the dongled phones not to disrupt the power supply.

Figure 6:
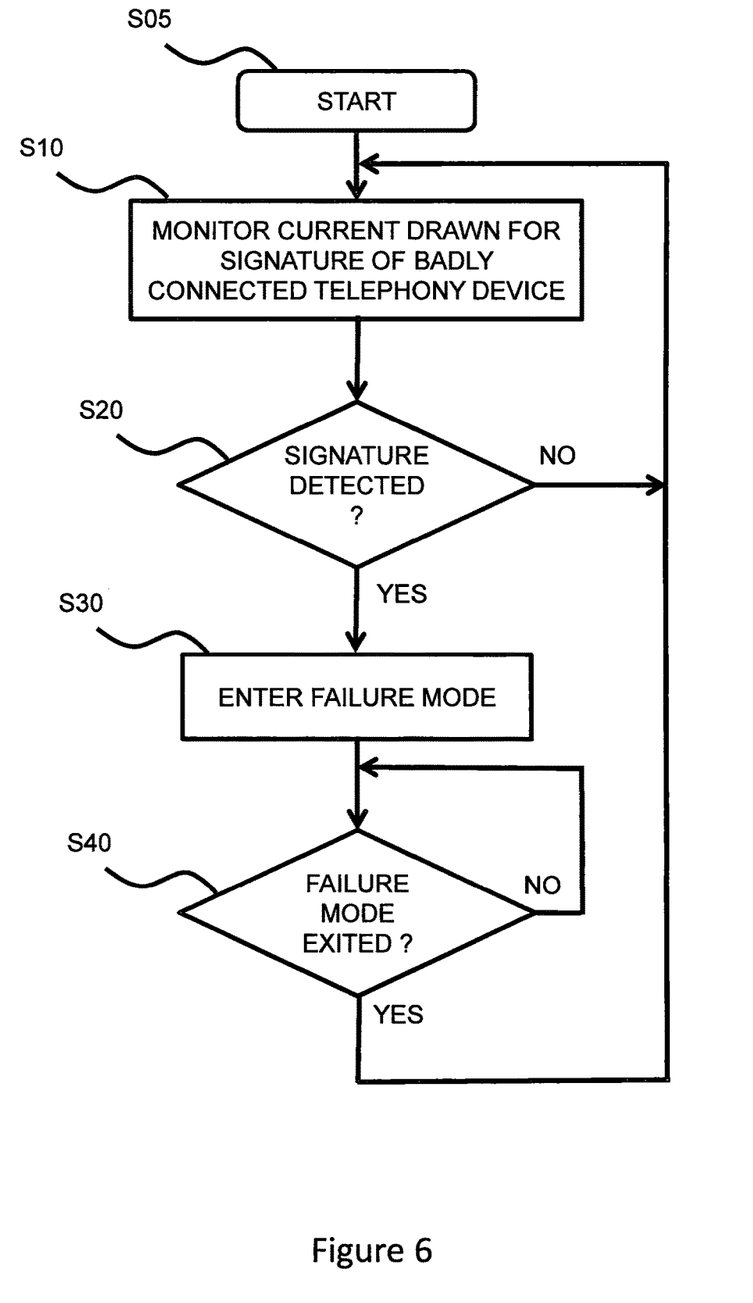
FIG. 6 is a flow chart of a method of detecting an inappropriately connected telephony device.

FIG. 6 illustrates the principal tasks of the method employed in embodiments in overview. As shown, the overall method commences at S05 and proceeds to a monitoring stage S10 in which the current drawn from the reverse feed power supply unit is monitored for the occurrence of a signature indicative of a misconnected device transitioning to (or initially being in) an off-hook state. At S20 the method determines if such a signature has indeed been detected and if so the method proceeds to S30, but otherwise the method loops back to S10 until such a detection is made.

At S30, the user premises device including the reverse feed power supply unit enters a fail mode in which the reverse power feed supply is switched off (or to a very low level—especially to a low level of maximum current/power draw where no damage should be caused to a misconnected device in an off-hook state) and in which a warning is generated for a user to indicate that a fail mode has been entered.

The method then proceeds to S40 in which it is determined whether or not the failure mode has been exited. In certain embodiments, the failure mode is only fully exited when a user makes a positive indication to the system that the problem (e.g. the misconnected device) has been rectified by the user (e.g. either by correctly connecting the device to either a suitable dongle or to the correct part of the telephone wiring (on the right side of an ATA, etc.) however, even whilst in failure mode, the system tries to restart the power supply on a regular basis and if the problem appears to go away (which could simply be because the misconnected telephone has been re-transitioned to an on-hook state), then the reverse feed power supply is restarted even whilst maintaining the warning (light or sound etc.) to encourage the user to take more permanent corrective action than simply returning the misconnected telephony device into the on-hook state. Once it is detected that that failure mode has been exited, the method returns to S10.

Figure 7:
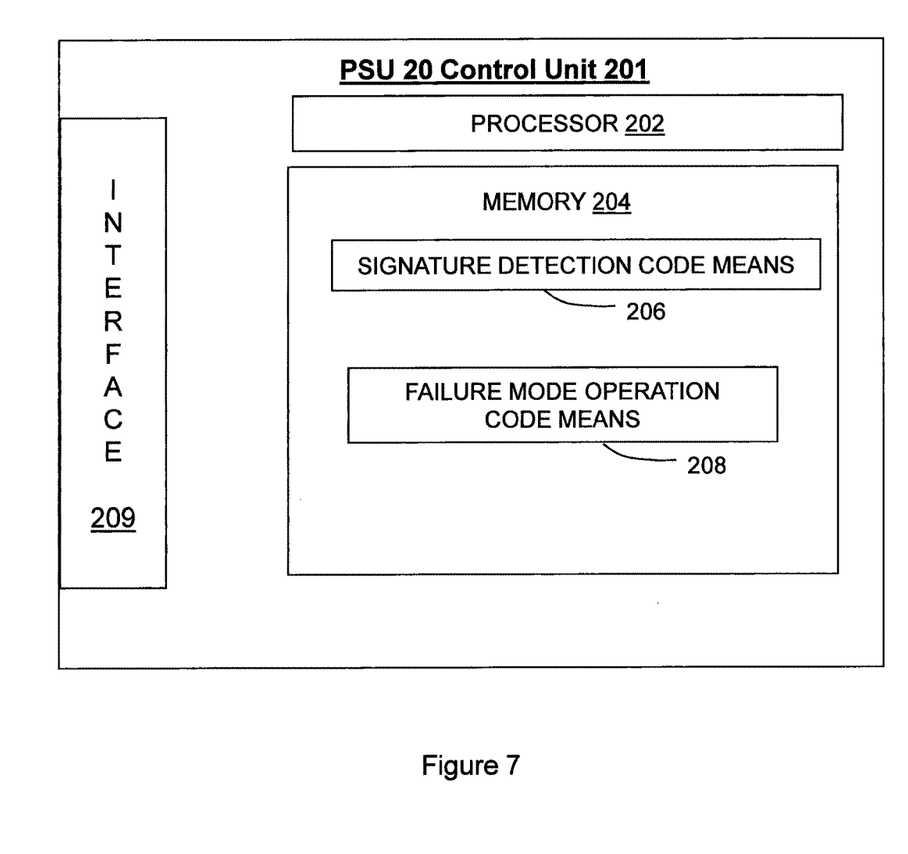
FIG. 7 is a schematic diagram of a controller for a reverse power supply unit suitable for enabling it to carry out the method illustrated in FIG. 6.

FIG. 7 illustrates an example PSU 20 Control unit 200 which could form part of a stand-alone control unit in alternative embodiments (note that in the embodiments illustrated in FIGS. 1-5, the same functionality is instead provided within the management controller 414). The control unit 201 includes a processor 202 and interface 209 and a memory 204. The memory 204 includes a signature detection code means for identifying that a signature indicative of a misconnected telephony device being or transitioning into an off-hook state has occurred. Such a signature could include, as discussed above, wither a sharp increase in the rate of current drawn, or that the level of current drawn exceeds a predetermined absolute amount within a predetermined period of the device starting up its reverse feed power supply. The memory 204 also includes a failure mode operation code means 208 for causing the PSU 20 to enter a failure mode when the signature detection code means has caused the PSU to detect a predetermined signature indicative of a misconnected telephony device being or transitioning into an off-hook state. Moreover, this code means 208 also controls the PSU to then as quickly as possible (preferably within a few milliseconds) switch off its reverse feed power supply (before excess current can be drawn from the power supply sufficient to potentially cause damage to the misconnected telephony device) and to cause an alarm to be generated which is only switched off when positive input from a user has been received to confirm that suitable corrective action has been taken by the user. Additionally, the failure mode operation code means 208 is operable to cause the PSU to regularly attempt to renegotiate a power supply signal to the PDU until it is determined that the misconnection problem has been resolved (including by the misconnected telephony device being transitioned back into an on-hook state) whereupon the reverse feed power supply is recommenced even though the PSU is not transitioned out of the failure mode (so that the alarm is not switched off until appropriate user action has occurred).

Variations

A further scenario for the use of embodiments is where the customer premises device does not contain an ATA but instead an ATA is included in the DPU. Such a scenario is described in greater detail in above referenced patent application WO2012069788. In such a system, dongles are again required to (amongst other things) prevent suitably dongled telephony devices from drawing excessive currents form the reverse feed power supply signal when in or transitioning into an off-hook state.

The invention claimed is:

1. A reverse power supply unit for supplying electrical power from a customer premises device to an access node via a twisted copper pair, the reverse power supply unit comprising:

a processor and a memory comprising a power consumption signature detector operable to detect if power drawn from the reverse power supply unit corresponds to a signature power consumption pattern indicative of a telephony device being in or transitioning into an off-hook state when connected directly to the reverse power supply unit and not being connected via a current limiting interface, wherein detection of a rate of increase of current consumption above a predetermined threshold amount corresponds to detection of the signature power consumption pattern indicative of a telephony device being in or transitioning into an off-hook state when connected directly to the reverse power supply unit and not being connected via a current limiting interface.

2. A reverse power supply unit according to claim 1 wherein detection of a current consumption above a predetermined threshold, if occurring within a predetermined, finite start-up period from commencement of supplying of reverse power by the reverse power supply unit, corresponds to detection of the signature power consumption pattern indicative of a telephony device being in or transitioning into an off-hook state when connected directly to the reverse power supply unit and not being connected via a current limiting interface.

3. A reverse power supply unit according to claim 1 wherein the current limiting device comprises a capacitor arrangement for limiting the amount of direct current passed through the current limiting interface.

4. A reverse power supply unit according to claim 3 wherein the current limiting interface is incorporated into either a dongle or a device for fitting in a master socket of a user's premises.

5. Customer premises equipment including a reverse power supply unit according to claim 1, and further comprising:

a current limit arrangement connected to a customer premises wiring for limiting at least one of the amount of current or the maximum rate of increase of current which can be drawn by a telephony device connected to the customer premises wiring to be no greater than a predetermined amount or rate, the customer premises wiring being connected to the twisted copper pair in such a manner that voice signals can be transmitted from the telephony device to an access node to which the twisted pair is connected.

6. An access network unit for use with the reverse power supply unit of claim 1 comprising:
   a rate of change of current limitation device, wherein the rate of change of current limitation device has one or more of the following properties:
      a maximum rate of change of current draw of less than 150 mA/s when connected to a 50V dc power supply; and
      the inclusion of a gyrator for performing the rate of change of current limitation providing a predetermined inductance in order to provide a predetermined maximum rate of change of current draw when increasing its power consumption from a specified dc power source.

7. A reverse power supply unit according to claim 4 wherein the current limiting interface is incorporated into an interstitial plate.

8. An access network unit for use with the customer premises equipment of claim 5 comprising:
   a rate of change of current limitation device, wherein the rate of change of current limitation device has one or more of the following properties:
      a maximum rate of change of current draw of less than 150 mA/s when connected to a 50V dc power supply; and
      the inclusion of a gyrator for performing the rate of change of current limitation providing a predetermined inductance in order to provide a predetermined maximum rate of change of current draw when increasing its power consumption from a specified dc power source.

\* \* \* \* \*